US012505793B2

(12) United States Patent
Li et al.

(10) Patent No.: US 12,505,793 B2
(45) Date of Patent: Dec. 23, 2025

(54) EOA CIRCUIT, DISPLAY PANEL, AND DISPLAY DEVICE

(71) Applicant: Everdisplay Optronics (Shanghai) Co., Ltd., Shanghai (CN)

(72) Inventors: Yong Li, Shanghai (CN); Zhinan Jia, Shanghai (CN)

(73) Assignee: Everdisplay Optronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 18/860,761

(22) PCT Filed: Aug. 11, 2022

(86) PCT No.: PCT/CN2022/111778

§ 371 (c)(1),
(2) Date: Oct. 28, 2024

(87) PCT Pub. No.: WO2024/016406

PCT Pub. Date: Jan. 25, 2024

(65) Prior Publication Data

US 2025/0299629 A1 Sep. 25, 2025

(30) Foreign Application Priority Data

Jul. 19, 2022 (CN) ......................... 202210846836.8

(51) Int. Cl.
*G09G 3/3225* (2016.01)

(52) U.S. Cl.
CPC ... *G09G 3/3225* (2013.01); *G09G 2300/0819* (2013.01); *G09G 2320/0233* (2013.01); *G09G 2320/0247* (2013.01)

(58) Field of Classification Search
CPC ......... G09G 3/3233; G09G 2300/0842; G09G 3/3266; G09G 2300/0861; G09G 2310/0286
See application file for complete search history.

(56) References Cited

U.S. PATENT DOCUMENTS

2014/0118409 A1 5/2014 Jun et al.
2017/0154572 A1* 6/2017 Kim ..................... G09G 3/3266
(Continued)

FOREIGN PATENT DOCUMENTS

CN 110619842 A 12/2019
CN 110782838 A 2/2020
(Continued)

OTHER PUBLICATIONS

CN201911107822A.Nov. 13, 2019 CN110782838A Pixel driving circuit, driving method, display panel and display device (Year: 2019).*
(Continued)

*Primary Examiner* — Van N Chow
(74) *Attorney, Agent, or Firm* — Qinghong Xu

(57) ABSTRACT

Provided are an EOA circuit, a display panel, and a display device. The EOA circuit comprises a first output module, used for generating a first control signal on the basis of a plurality of reference voltage signals and a plurality of clock signals, the first control signal being used for controlling the working state of the light-emitting element; and an inverting output module, connected to the first output module, and used for performing inverting conversion on the basis of the first control signal to generate a second control signal, the second control signal being used for controlling to disable initialization of the anode of the light-emitting element when the light-emitting element emits light and controlling to enable initialization of the anode of the light-emitting element when the light-emitting element does not emit light.

18 Claims, 5 Drawing Sheets

(56) References Cited

U.S. PATENT DOCUMENTS

| | | | | |
|---|---|---|---|---|
| 2020/0402458 | A1* | 12/2020 | Gao | G09G 3/3233 |
| 2022/0208082 | A1* | 6/2022 | Ban | G09G 3/3258 |
| 2022/0375395 | A1* | 11/2022 | Zhao | G09G 3/3233 |
| 2023/0093268 | A1* | 3/2023 | Chen | G09G 3/32<br>345/55 |

FOREIGN PATENT DOCUMENTS

| | | | |
|---|---|---|---|
| CN | 111489701 | A | 8/2020 |
| CN | 111524486 | A | 8/2020 |
| CN | 111833816 | A | 10/2020 |
| CN | 113838421 | A | 12/2021 |
| CN | 114120917 | A | 3/2022 |

OTHER PUBLICATIONS

International Search Report dated Dec. 29, 2022 of International Application No. PCT/CN2022/111778.

* cited by examiner

EOA CIRCUIT, DISPLAY PANEL, AND DISPLAY DEVICE

CROSS-REFERENCE TO RELATED APPLICATION

The present application is a US national phase of International Application No. PCT/CN2022/111778, filed on Aug. 11, 2022, which is based upon and claims priority to Chinese Patent Application No. 202210846836.8, filed on Jul. 19, 2022, the entire contents of both of which are incorporated herein by reference.

TECHNICAL FIELD

The present disclosure relates to the technical field of display panels, and specifically to an Emission Driver On Array (EOA) circuit, a display panel and a display device.

BACKGROUND

OLED display panels have a flicker phenomenon at low frequencies, which is related to OLED initialization in addition to TFT characteristics. Especially, when the gray level is low, the brightness is low at beginning of each frame, and then gradually recovers (as shown in FIG. 1). Generally, the flicker phenomenon is improved by means of black insertion, that is, by inserting multiple black pictures in one frame (an EM signal being turned off).

However, since an anode of the OLED is initialized at the beginning of each frame, and there is no initialization action for the anode of the OLED during the black insertion, the brightness will decrease during the black insertion, but it cannot be reduced to the brightness at the beginning of each frame, resulting in an increase in the average brightness of the OLED and thus the screen flickering phenomenon being observed by the human eyes.

SUMMARY

In view of this, the present disclosure provides an EOA circuit, a display panel and a display device.

According to an aspect of the present disclosure, there is provided an EOA circuit, including:

a first output module, configured to generate a first control signal based on multiple reference voltage signals and multiple clock signals, the first control signal being used to control an operation state of a light emitting element; and an inverting output module, connected to the first output module and configured to generate a second control signal by performing inverting conversion based on the first control signal, the second control signal being used to control an anode of the light-emitting element to close initialization when the light-emitting element emits light, and to control the anode of the light-emitting element to start initialization when the light-emitting element does not emit light.

In some embodiments, the EOA circuit synchronously outputs the first control signal and the second control signal with opposite logic levels.

In some embodiments, the inverting output module includes a twelfth switch device, a thirteenth switch device and a fourteenth switch device, a first electrode of the thirteenth switch device is connected to the reference voltage signal, a second electrode of the thirteenth switch device is connected to a first electrode of the fourteenth switch device, and a third electrode of the thirteenth switch device is connected to the first control signal; a first electrode and a third electrode of the twelfth switch device are both connected to the clock signals, a second electrode of the twelfth switch device is connected to a third electrode of the fourteenth switch device, and a second electrode of the fourteenth switch device is connected to the reference voltage signal.

In some embodiments, the inverting output module further includes a fourth capacitor, a first terminal of the fourth capacitor is connected to the second electrode of the twelfth switch device and the third electrode of the fourteenth switch device, respectively, and a second terminal of the fourth capacitor is connected to the clock signal.

In some embodiments, the clock signals include a third clock signal and a fourth clock signal; during a first time period, the third clock signal is at a high level, and the fourth clock signal is at a low level in an early stage, so that the first output module outputs a low-level signal; the low-level signal is applied to the third electrode of the thirteenth switch device, turning on the thirteenth switch device, so that the inverting output module outputs a high-level signal.

In some embodiments, the clock signals include a second clock signal and a third clock signal; during a second time period, the second clock signal is at a low level, and the third clock signal is at a low level in an early stage, so that the first output module outputs a high-level signal; the third clock signal is applied to the third electrode of the twelfth switch device, turning on the twelfth switch device, and the second clock signal is applied to the third electrode of the fourteenth switch device, turning on the fourteenth switch device, so that the inverting output module outputs a low-level signal.

In some embodiments, the clock signals include a third clock signal; during a third time period, the third clock signal is at a high level, and the third clock signal is applied to the twelfth switch device, turning off the twelfth switch device, the first output module outputs a high-level signal, and the inverting output module outputs a low-level signal.

In some embodiments, the clock signals include a third clock signal; during a fourth time period, the third clock signal is at a low level in an early stage, the first output module outputs a high-level signal, and the inverting output module outputs a low-level signal.

In some embodiments, the clock signals include a first clock signal and a second clock signal; during a fifth time period, the first clock signal is at a low level, the second clock signal is at a high level, the first output module outputs a low-level signal, and the inverting output module outputs a high-level signal.

In some embodiments, the reference voltage signals include a first reference voltage and a second reference voltage, the first reference voltage is a high-level signal, and the second reference voltage is a low-level signal.

In some embodiments, the twelfth switch device, the thirteenth switch device and the fourteenth switch device are P-type thin film transistors or N-type thin film transistors.

According to another aspect of the present disclosure, a display panel is provided, and the display panel includes any of the EOA circuits described above.

According to another aspect of the present disclosure, a display device is provided, and the display device includes the above display panel.

BRIEF DESCRIPTION OF THE DRAWINGS

The accompanying drawings herein are incorporated into and constitute a part of the specification, illustrate embodiments consistent with the present disclosure, and together with the specification are used to explain the principles of the present disclosure. Obviously, the accompanying drawings described below are only some embodiments of the present disclosure, and for those of ordinary skill in the art, other accompanying drawings can be obtained based on these accompanying drawings without creative work.

DETAILED DESCRIPTION

Figure 1A:
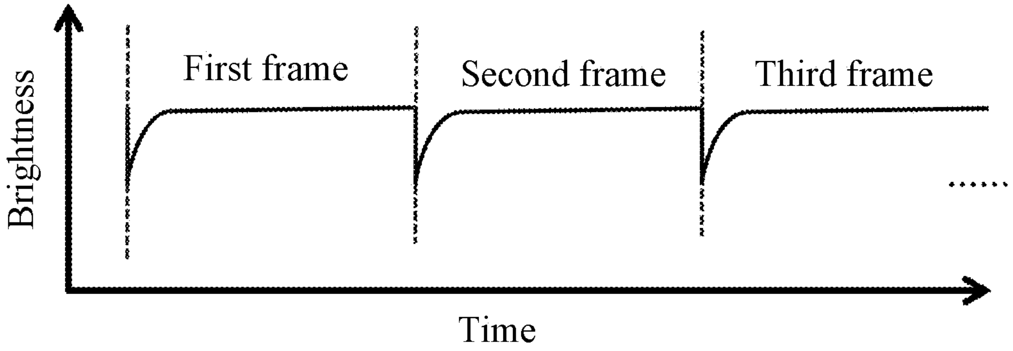
FIG. 1*a* is a schematic diagram showing brightness changes of an existing OLED display panel without black insertion.

The example embodiments will now be described more fully with reference to the accompanying drawings. The example embodiments may, however, be embodied in many different forms and should not be construed as being limited to the embodiments set forth herein. Rather, these embodiments are provided so that the present disclosure will be thorough and complete, and the concept of the example embodiments are fully conveyed to those skilled in the art. The features, structures, or characteristics described may be combined in one or more embodiments in any suitable manner. In the following description, numerous specific details are provided to give a thorough understanding of the embodiments of the present disclosure. Those skilled in the art will recognize, however, that the technical solutions of the present disclosure can be practiced without one or more of the specific details, or with other methods, materials, devices, etc. In some other instances, well-known technical solutions have not been shown or described in detail to avoid obscuring aspects of the present disclosure. The same reference numerals in the drawings denote the same or similar structures, and thus detailed description thereof will be omitted.

The terms "a", "an", "the", "said" and "at least one" are used to indicate the presence of one or more elements/components/parts/and so on; the terms "comprising", "having" and "providing" are intended to be inclusive in open-ended meanings and mean that there may be additional elements/components/and so on in addition to the elements/components/and so on listed.

Figure 1B:
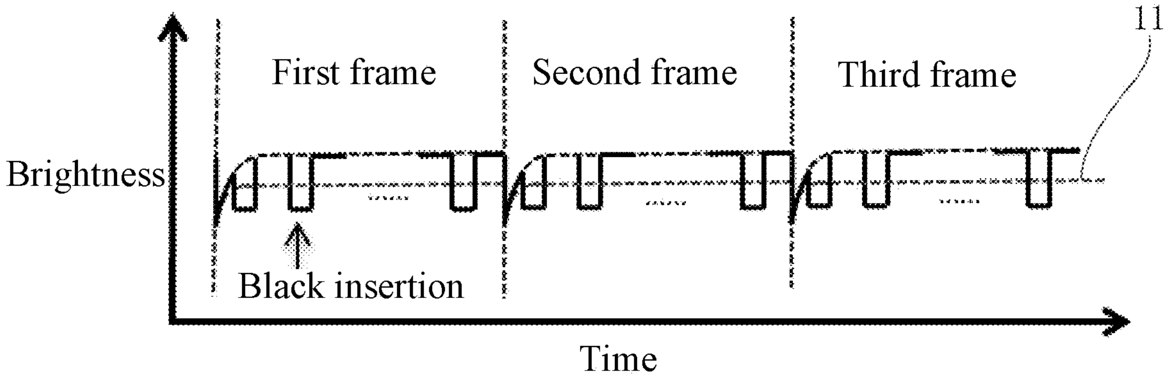
FIG. 1*b* is a schematic diagram showing brightness changes of an existing OLED display panel with black insertion.

FIG. 1*a* and FIG. 1*b* are schematic diagrams showing brightness changes of an existing OLED display panel without black insertion and with black insertion, respectively. As shown in FIG. 1*a*, the brightness of the OLED light-emitting element is low at the beginning of each frame, and then the brightness gradually recovers. A curve 11 in FIG. 1*b* shows the actual display brightness after the black insertion. As shown in FIG. 1*b*, although the brightness will decrease during the black insertion, it cannot be reduced to the brightness at the beginning of each frame, resulting in an increase in the average brightness of the OLED and thus the screen flickering phenomenon being observed by the human eyes.

The present disclosure discloses an EOA circuit, which includes a first output module 21 and an inverting output module 22 that are connected to each other. The first output module 21 generates a first control signal based on multiple reference voltage signals and multiple clock signals. The first control signal is used to control an operation state of the light emitting element.

The inverting output module 22 performs inverting conversion based on the first control signal and generate a second control signal. The second control signal is used to control an anode of the light-emitting element to close initialization when the light-emitting element emits light, and to control the anode of the light-emitting element to start initialization when the light-emitting element does not emit light.

The EOA circuit disclosed in the present disclosure synchronously outputs the first control signal and the second control signal with opposite logic levels.

The EOA circuit disclosed in the present disclosure includes multiple switch devices, and the switch devices can use P-type thin film transistors or N-type thin film transistors. The switch devices in the EOA circuit are of the same type, that is, all the switch devices are P-type thin film transistors, or all the switch devices are N-type thin film transistors. When all the switch devices are P-type thin film transistors (P-type TFT), they are low-level triggered (an effective level is a low level). When all the switch devices are N-type thin film transistors (N-type TFT), they are high-level triggered (the effective level is a high level).

Figure 2:
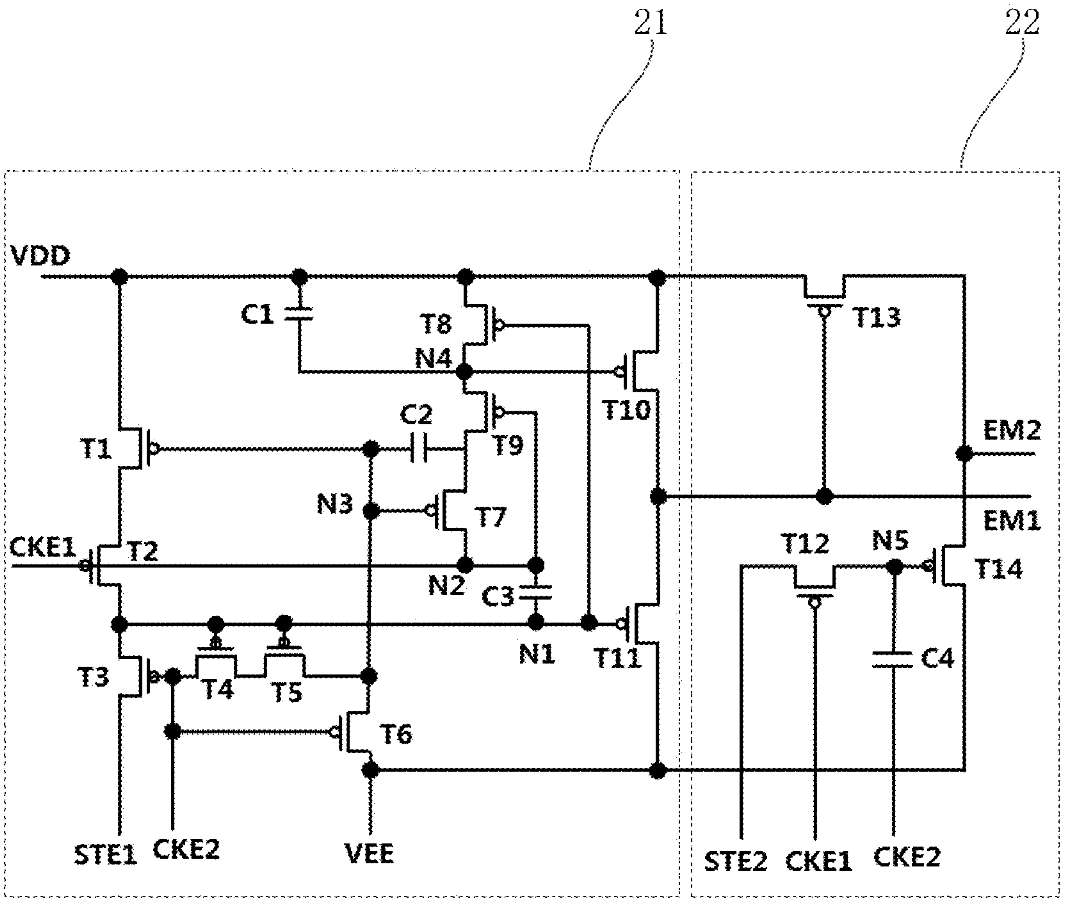
FIG. 2 is a schematic structural diagram of an EOA circuit disclosed in an embodiment of the present disclosure.

As shown in FIG. 2, an embodiment of the present disclosure discloses an EOA circuit. The EOA circuit includes a first output module 21 and an inverting output module 22 that are connected to each other. It should be noted that the switch devices selected in the circuit design of this embodiment are all P-type TFTs, but the present disclosure is not limited to this.

In this embodiment, the reference voltage signals include a first reference voltage and a second reference voltage, the first reference voltage is a high-level signal, and the second reference voltage is a low-level signal. In this embodiment, the first reference voltage is a VDD voltage, and the second reference voltage is a VEE voltage. The clock signals include a first clock signal STE1, a second clock signal STE2, a third clock signal CKE1, and a fourth clock signal CKE2.

In this embodiment, the first output module 21 includes a first switch device T1, a second switch device T2, a third switch device T3, a fourth switch device T4, a fifth switch device T5, a sixth switch device T6 and a first capacitor C1. Referring to FIG. 2, a first electrode of the first switch device T1 is connected to the first reference voltage VDD, and a second electrode of the first switch device T1 is connected to a first electrode of the second switch device T2. A third electrode of the second switch device T2 is connected to the third clock signal CKE1. A second electrode of the third switch device T3 is connected to the first clock signal STE1. A third electrode of the third switch device T3 is connected to the fourth clock signal CKE2. A second electrode of the sixth switch device T6 is connected to the second reference voltage VEE.

In this embodiment, the first output module 21 further includes a seventh switch device T7, an eighth switch device T8, a ninth switch device T9, a tenth switch device T10, an eleventh switch device T11, a second capacitor C2, and a third capacitor C3. In FIG. 2, points N1, N2, N3, and N4 of the first output module 21 are all reference points. The connection relationship between all elements (including all switch devices and all capacitors) of the first output module 21, and the connection relationship between the elements and the reference voltages or between the elements and the clock signals can be as shown in FIG. 2, and will not be described in detail here. The EM1 signal output by the first output module 21 is the first control signal. The second electrode of the tenth switch device T10 and the first electrode of the eleventh switch device T11 are respectively connected to the EM1 signal.

In this embodiment, the inverting output module 22 includes a twelfth switch device T12, a thirteenth switch device T13, a fourteenth switch device T14, and a fourth capacitor C4. The point N5 of the inverting output module 22 in FIG. 2 is also a reference point. The first electrode and the second electrode of the tenth switch device T10 in the first output module 21 are both connected to the inverting output module 22, and the first electrode and the second electrode of the eleventh switch device T11 are both connected to the inverting output module 22. The EM2 signal output by the inverting output module 22 is the second control signal.

Specifically, the first electrode of the tenth switch device T10 is connected to the first electrode of the thirteenth switch device T13, and the second electrode of the tenth switch device T10 is connected to the third electrode of the thirteenth switch device T13. The first electrode of the eleventh switch device T11 is connected to the third electrode of the thirteenth switch device T13 and the second electrode of the tenth switch device T10, respectively. The second electrode of the eleventh switch device T11 is connected to the second electrode of the fourteenth switch device T14.

The first electrode of the twelfth switch device T12 is connected to the second clock signal STE2, the third electrode of the twelfth switch device T12 is connected to the third clock signal CKE1, and the second electrode of the twelfth switch device T12, a first terminal of the fourth capacitor C4 and the third electrode of the fourteenth switch device T14 are connected to each other, forming the reference point N5. A second terminal of the fourth capacitor C4 is connected to the fourth clock signal CKE2. The third electrode of the thirteenth switch device T13 is connected to the EM1 signal. The second electrode of the thirteenth switch device T13 and the first electrode of the fourteenth switch device T14 are respectively connected to the EM2 signal.

It should be noted that, in some other embodiments, the second terminal of the fourth capacitor C4 may also be connected to the first reference voltage VDD or the second reference voltage VEE, which is not limited in the present disclosure.

The second electrode of the thirteenth switch device T13 is connected to the first electrode of the fourteenth switch device T14, and the first electrode of the thirteenth switch device T13 is connected to the first reference voltage VDD.

It should be noted that, in this embodiment, the first electrodes of all the above switch devices may be a source or a drain, the second electrodes of all the above switch devices may also be a source or a drain, and the third electrode of all the above switch devices may be a gate. When the first electrode of the switch device is one of the source or the drain, the second electrode is the other of the source and the drain. The third electrodes of all the switch devices are gates.

In this embodiment, all the switch devices (the first switch device to the fourteenth switch device) are P-type TFTs, that is, the effective level is low level. However, the present disclosure is not limited to this type of switch device.

Figure 3:
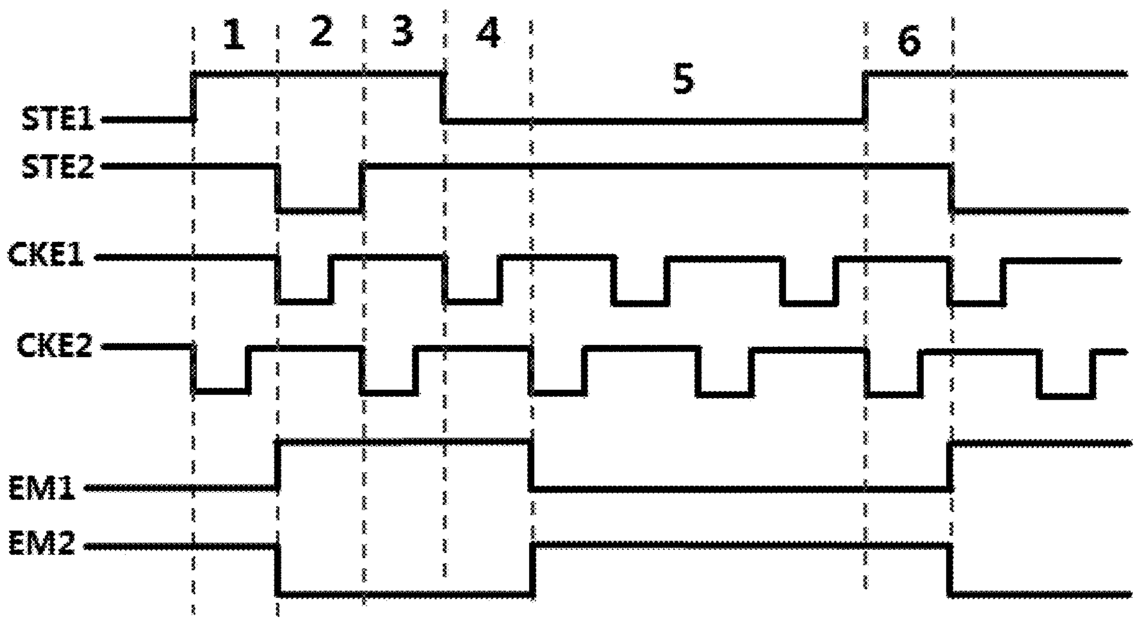
FIG. 3 is a schematic diagram of an operation sequence of the EOA circuit disclosed in an embodiment of the present disclosure.

FIG. 3 is a schematic diagram of an operation sequence of the EOA circuit disclosed in an embodiment of the present disclosure. As shown in FIG. 3, during a first time period (i.e., period 1 in FIG. 3), the first clock signal STE1 and the second clock signal STE2 are both at high level, and the third clock signal CKE1 is at high level. The fourth clock signal CKE2 is at low level in an early stage of the first time period, causing the third switch device T3 and the sixth switch device T6 to be turned on. The reference point N1 is written with the high potential of the first clock signal STE1, causing the eleventh switch device T11, to be turned off, and the reference point N3 is pulled low, causing the first switch device T1 to be turned on. The reference point N4 remains at the high potential of the previous frame, causing the tenth switch device T10 to be turned off, and the EM1 signal remains at the low level. At the same time, the thirteenth switch device T13 is turned on, and the EM2 signal output by the inverting output module 22 is at high level.

In a later stage of the first time period, although the fourth clock signal CKE2 jumps from low level to high level, it does not affect the output results of the EM1 signal and the EM2 signal, that is, the EM1 signal remains at low level and the EM2 signal remains at high level. The specific process will not be analyzed here.

During a second time period (that is, period 2 in FIG. 3), the first clock signal STE1 remains at high level, the second clock signal STE2 is at low level, the third clock signal CKE1 is at low level in an early stage, and the fourth clock signal CKE2 is at high level. The low-level CKE1 signal causes the second switch device T2 to be turned on. The second capacitor C2 keeps the reference point N3 at the low potential of the first time period, so that the first switch device T1 remains in the turned-on state. The reference point N1 is written with the high potential of the first reference voltage VDD, causing the eighth switch device T8 and the eleventh switch device T11 to be turned off. The seventh switch device T7 and the ninth switch device T9 are turned on, causing the low potential of the CKE1 signal to be written into the N4 point. The tenth switch device T10 is turned on, and the EM1 signal output is at high potential. The thirteenth switch device T13 is turned off, the low potential of the CKE1 signal causes the twelfth switch device T12 to be turned on, the low potential of the STE2 signal is written into the N5 point, the fourteenth switch device T14 is turned on, and the EM2 signal output is at low potential.

In a later stage, although the CKE1 signal jumps from low level to high level, it does not affect the output results of the EM1 signal and EM2 signal because the ninth switch device T9 is turned off at this time, the C1 capacitor keeps the N4 point at the low potential, and the tenth switch device T10 remains in the turned-on state.

During a third time period (i.e., period 3 in FIG. 3), the first clock signal STE1, the second clock signal STE2 and the third clock signal CKE1 are all at high levels. The fourth clock signal CKE2 is at a low level in an early stage. The low-level CKE2 signal causes the third switch device T3 and the sixth switch device T6 to be turned on, and the N3 point is written with the low potential. The N1 point is written with the high potential of the STE1 signal, causing the eighth switch device T8 and the eleventh switch device T11 to be turned off. The high potential of the CKE1 signal turns off the ninth switch device T9, the C1 capacitor keeps the N4 point at the low potential, the tenth switch device T10 is turned on, the EM1 signal output is at the high potential, and the thirteenth switch device T13 is turned off at the same time. The high potential of the CKE1 signal turns off the twelfth switch device T12, the C4 capacitor keeps the N5 point at the low potential written in the second time period, so that the fourteenth switch device T14 remains in the turned-on state, and the EM2 signal output is at the low potential. Similarly, when the CKE2 signal jumps from the low level to the high level in the later stage, it will not affect the output results of the EM1 signal and the EM2 signal.

During a fourth time period (i.e., period 4 in FIG. 3), the third clock signal CKE1 is at low level in an early stage, the first clock signal STE1 is at low level, the second clock signal STE2 is at high level, and the fourth clock signal CKE2 is at high level. The low potential of the CKE1 signal causes the second switch device T2 to be turned on, the N3 point is written with the low potential, causing the first switch device T1 to be turned on, and the N1 point is written with the high potential of the first reference voltage VDD, causing the eighth switch device T8 and the eleventh switch device T11 to be turned off. The EM1 signal output is at the high potential, and the EM2 signal output is at the low potential. Similarly, when the CKE1 signal jumps from low level to high level in the later stage, it will not affect the output results of the EM1 signal and EM2 signal.

During a fifth time period (i.e., period 5 in FIG. 3), the first clock signal STE1 is at low level, and the second clock signal STE2 is at high level. The low potential of the CKE2 signal turns on the third switch device T3, and the N1 point is written with the low potential of the STE1 signal, causing the eleventh switch device T11 to be turned on. At this time, the EM1 signal output is at the low potential. The low potential of the EM1 output turns on the thirteenth switch device T13. Within the fifth time period, whenever the CKE1 signal jumps to the low potential, the high potential of STE2 is written into the N5 point, and is maintained by the capacitor C4, causing the switch device T14 to be turned off, and the EM2 output is at the high potential. Therefore, the transition of the CKE1 signal and CKE2 signal during this time period does not affect the output results of the EM1 signal and EM2 signal.

In this embodiment, the above operation sequence is periodic, and every five time periods constitute a cycle. Therefore, the output results during the sixth time period are the same as those of the first time period, and will not be described again in this embodiment. The first time period to the fifth time period are arranged in a chronological order.

Figure 4:
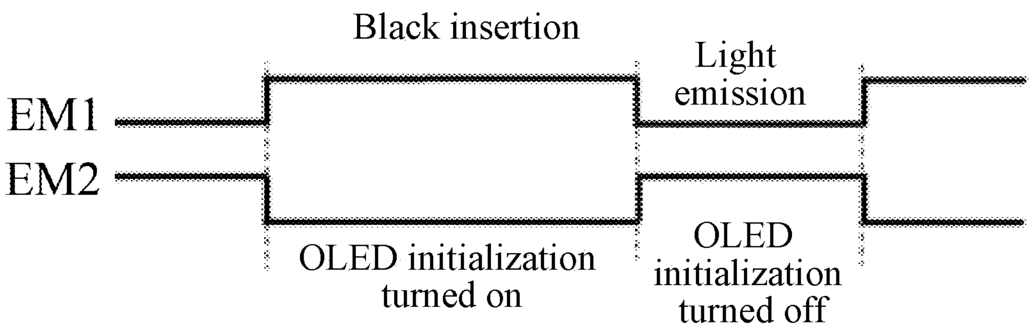
FIG. 4 is a schematic diagram of voltage waveforms of outputs corresponding to two output signals in the EOA circuit provided in an embodiment of the present disclosure.

Referring to FIG. 4, it shows voltage waveforms of the two output signals (EM1 signal and EM2 signal, respectively) in the EOA circuit provided in the above embodiment of the present disclosure. The two sets of voltage waveforms are opposite to each other. As shown in FIG. 4, the EM1 signal controls turning-on of the EM signal, and the EM2 signal controls initialization of the OLED. Whenever the EM signal that controls the light-emitting element to emit light is turned off (black insertion), the initialization of the starts, and when the EM signal is turned on (light emission), the initialization of the OLED is closed. As such, the OLED brightness after each black insertion is consistent with the brightness at the beginning of the first frame, and in the situation of multiple black insertions, the brightness fluctuation in each frame can be made more uniform, further reducing the flicker phenomenon.

It should be noted that, in the present disclosure, the low potential and the low level mentioned above have the same meaning, and similarly, the high potential and the high level have the same meaning.

It should be noted that, in a specific implementation, the first output module 21 for outputting the EM1 signal may also be implemented by employing other existing circuit modules, and the present disclosure does not impose any limitation on this.

An embodiment of the present disclosure also discloses a pixel driving circuit, which provides timing sequences by employing the EOA circuit disclosed in any of the above embodiments. For detailed structural features and advantages of the EOA circuit, reference can be made to the description of the above embodiments, which will not be described again here.

An embodiment of the present disclosure also discloses a display panel, which includes the EOA circuit disclosed in any of the above embodiments. For detailed structural features and advantages of the EOA circuit, reference can be made to the description of the above embodiments, which will not be described again here.

Some embodiments of the present disclosure also provide a display device, which includes the above display panel.

The display device provided in the embodiments of the present disclosure may be any device that displays images, whether moving (e.g., video) or fixed (e.g., still images), and whether in text or in image. More specifically, it is contemplated that the embodiments may be implemented in or in connection with various electronic devices. The various electronic devices includes, for example (but are not limited to), mobile phones, wireless devices, personal data assistants (PDAs), handheld or portable computers, GPS receivers/navigators, cameras, MP4 video players, camcorders, game consoles, watches, clocks, calculators, television monitors, flat panel displays, computer monitors, automotive displays (e.g., odometer displays, etc.), navigators, cockpit controls and/or displays, camera view displays (e.g., displays for rear-view cameras in vehicles), electronic photos, electronic billboards or signs, projectors, architectural structures, packaging and aesthetic structures, etc.

To sum up, the EOA circuit, display panel and display device of the present disclosure have at least the following advantages.

In the EOA circuit, display panel, and display device disclosed in the embodiments, the operation state of the light-emitting element is controlled using the first control signal, and the initialization of the anode of the light-emitting element is controlled, using the second control signal, to be enabled when the EM signal is turned off, which realizes that the initialization action of the anode of the light-emitting element is performed synchronously during the black insertion, thereby alleviating the flicker phenomenon at low frequencies.

Those described above are more detailed illustrations of the present disclosure in connection with specific and preferred embodiments, and it is not intended that the present disclosure be limited to these specific illustrations. For those skilled in the art to which the present disclosure pertains, simple deductions or substitutions can be made without departing from the spirit of the present disclosure, which all shall be considered as belonging to the protection scope of the present disclosure.

What is claimed is:

1. An Emission Driver On Array (EOA) circuit, comprising:

a first output module, configured to generate a first control signal based on multiple reference voltage signals and multiple clock signals, the first control signal being used to control an operation state of a light emitting element; and an inverting output module, connected to the first output module and configured to generate a second control signal by perform inverting conversion based on the first control signal, the second control signal being used to control an anode of the light-emitting element to close initialization when the light-emitting element emits light and to control the anode of the light-emitting element to start initialization when the light-emitting element does not emit light, wherein the inverting output module includes a twelfth switch device, a thirteenth switch device and a fourteenth switch device, a first electrode of the thirteenth switch device is connected to the reference voltage signals, a second electrode of the thirteenth switch device is connected to a first electrode of the fourteenth switch device, and a third electrode of the thirteenth switch device is connected to the first control signal; a first electrode and a third electrode of the twelfth switch device are both connected to the clock signals, a second electrode of the twelfth switch device is connected to a third electrode of the fourteenth switch device, and a second electrode of the fourteenth switch device is connected to the reference voltage signals.

2. The EOA circuit according to claim 1, wherein the EOA circuit synchronously outputs the first control signal and the second control signal having opposite logic levels.

3. The EOA circuit according to claim 1, wherein the inverting output module further comprises a fourth capacitor, a first terminal of the fourth capacitor is respectively connected to a second electrode of the twelfth switch device and the third electrode of the fourteenth switch device, and a second terminal of the fourth capacitor is connected to the clock signals.

4. The EOA circuit according to claim 1, wherein the clock signals comprises a third clock signal and a fourth clock signal; during a first time period, the third clock signal is at a high level, and the four clock signal is at a low level in an early stage of the first time period, causing the first output module to output a low-level signal; the low-level signal is applied to the third electrode of the thirteenth switch device, and the thirteenth switch device is turned on, causing the inverting output module to output a high-level signal.

5. The EOA circuit according to claim 1, wherein the clock signals comprises a second clock signal and a third clock signal; during a second time period, the second clock signal is at a low level, and the third clock signal is at a low level in an early stage of the second time period, causing the first output module to output a high-level signal; the third clock signal is applied to the third electrode of the twelfth switch device and the twelfth switch device is turned on, the second clock signal is applied to the third electrode of the fourteenth switch device and the fourteenth switch device is turned on, causing the inverting output module to output a low-level signal.

6. The EOA circuit according to claim 1, wherein the clock signals comprise a third clock signal; during a third time period, the third clock signal is at a high level, and the third clock signal is applied to the twelfth switch device, the twelfth switch device is turned off, the first output module outputs a high-level signal, and the inverting output module outputs a low-level signal.

7. The EOA circuit according to claim 1, wherein the clock signals comprises a third clock signal; during a fourth time period, the third clock signal is at low level in an early stage, the first output module outputs a high-level signal, and the inverting output module outputs a low-level signal.

8. The EOA circuit according to claim 1, wherein the clock signals comprises a first clock signal and a second clock signal; during a fifth time period, the first clock signal is at a low level, the second clock signal is at a high level, the first output module outputs a low-level signal, and the inverting output module outputs a high-level signal.

9. The EOA circuit according to claim 1, wherein the reference voltage signals comprise a first reference voltage and a second reference voltage, the first reference voltage is a high-level signal, and the second reference voltage is a low-level signal.

10. The EOA circuit according to claim 1, wherein the twelfth switch device, the thirteenth switch device and the fourteenth switch device are P-type thin film transistors or N-type thin film transistors.

11. A display panel, comprising an EOA circuit, the EOA circuit comprising:

a first output module, configured to generate a first control signal based on multiple reference voltage signals and multiple clock signals, the first control signal being used to control an operation state of a light emitting element; and an inverting output module, connected to the first output module and configured to generate a second control signal by perform inverting conversion based on the first control signal, the second control signal being used to control an anode of the light-emitting element to close initialization when the light-emitting element emits light and to control the anode of the light-emitting element to start initialization when the light-emitting element does not emit light, wherein the inverting output module includes a twelfth switch device, a thirteenth switch device and a fourteenth switch device, a first electrode of the thirteenth switch device is connected to the reference voltage signals, a second electrode of the thirteenth switch device is connected to a first electrode of the fourteenth switch device, and a third electrode of the thirteenth switch device is connected to the first control signal; a first electrode and a third electrode of the twelfth switch device are both connected to the clock signals, a second electrode of the twelfth switch device is connected to a third electrode of the fourteenth switch device, and a second electrode of the fourteenth switch device is connected to the reference voltage signals.

12. The display panel according to claim 11, wherein the EOA circuit synchronously outputs the first control signal and the second control signal having opposite logic levels.

13. The display panel according to claim 11, wherein the inverting output module further comprises a fourth capacitor, a first terminal of the fourth capacitor is respectively connected to a second electrode of the twelfth switch device and the third electrode of the fourteenth switch device, and a second terminal of the fourth capacitor is connected to the clock signals.

14. The display panel according to claim 11, wherein the clock signals comprises a third clock signal and a fourth clock signal; during a first time period, the third clock signal is at a high level, and the four clock signal is at a low level in an early stage of the first time period, causing the first output module to output a low-level signal; the low-level signal is applied to the third electrode of the thirteenth switch device, and the thirteenth switch device is turned on, causing the inverting output module to output a high-level signal.

15. The display panel according to claim 11, wherein the clock signals comprises a second clock signal and a third clock signal; during a second time period, the second clock signal is at a low level, and the third clock signal is at a low level in an early stage of the second time period, causing the first output module to output a high-level signal; the third clock signal is applied to the third electrode of the twelfth switch device and the twelfth switch device is turned on, the second clock signal is applied to the third electrode of the fourteenth switch device and the fourteenth switch device is turned on, causing the inverting output module to output a low-level signal.

16. The display panel according to claim 11, wherein the clock signals comprise a third clock signal; during a third time period, the third clock signal is at a high level, and the third clock signal is applied to the twelfth switch device, the twelfth switch device is turned off, the first output module outputs a high-level signal, and the inverting output module outputs a low-level signal.

17. The display panel according to claim 11, wherein the clock signals comprises a third clock signal; during a fourth time period, the third clock signal is at low level in an early stage, the first output module outputs a high-level signal, and the inverting output module outputs a low-level signal.

18. A display device, comprising a display panel, the display panel comprising an EOA circuit, the EOA circuit comprising:

a first output module, configured to generate a first control signal based on multiple reference voltage signals and multiple clock signals, the first control signal being used to control an operation state of a light emitting element; and an inverting output module, connected to the first output module and configured to generate a second control signal by perform inverting conversion based on the first control signal, the second control signal being used to control an anode of the light-emitting element to close initialization when the light-emitting element emits light and to control the anode of the light-emitting element to start initialization when the light-emitting element does not emit light, wherein the inverting output module includes a twelfth switch device, a thirteenth switch device and a fourteenth switch device, a first electrode of the thirteenth switch device is connected to the reference voltage signals, a second electrode of the thirteenth switch device is connected to a first electrode of the fourteenth switch device, and a third electrode of the thirteenth switch device is connected to the first control signal; a first electrode and a third electrode of the twelfth switch device are both connected to the clock signals, a second electrode of the twelfth switch device is connected to a third electrode of the fourteenth switch device, and a second electrode of the fourteenth switch device is connected to the reference voltage signals.

* * * * *